(12) United States Patent
Lahart et al.

(10) Patent No.: US 12,544,888 B2
(45) Date of Patent: Feb. 10, 2026

(54) GENDERLESS INTERFACE CONNECTOR PULL TOOL

(71) Applicant: MSD International GmbH, Lucerne (CH)

(72) Inventors: Noel Lahart, Kilkenny (IE); Brian Mullarkey, Carlow (IE); John Hayes, Tipperary (IE)

(73) Assignee: MSD International GMBH, Lucerne (CH)

( * ) Notice: Subject to any disclaimer, the term of this patent is extended or adjusted under 35 U.S.C. 154(b) by 767 days.

(21) Appl. No.: 17/943,664

(22) Filed: Sep. 13, 2022

(65) Prior Publication Data

US 2024/0083000 A1 Mar. 14, 2024

(51) Int. Cl.
*B25B 27/02* (2006.01)
*F16L 33/02* (2006.01)

(52) U.S. Cl.
CPC .............. *B25B 27/02* (2013.01); *F16L 33/02* (2013.01); *F16L 2201/44* (2013.01)

(58) Field of Classification Search
CPC ............................. F16K 27/04; F16L 2201/44
See application file for complete search history.

(56) References Cited

U.S. PATENT DOCUMENTS

| | | | | |
|---|---|---|---|---|
| 3,865,411 A | * | 2/1975 | Rowe | F16K 7/18 285/915 |
| 4,149,534 A | * | 4/1979 | Tenczar | A61M 39/14 285/125.1 |
| 4,306,705 A | * | 12/1981 | Svensson | A61F 5/4405 604/905 |
| 6,422,535 B1 | * | 7/2002 | Stone | F16K 3/0227 251/327 |
| 6,679,529 B2 | * | 1/2004 | Johnson | F16L 29/00 604/905 |
| 7,137,974 B2 | * | 11/2006 | Almasian | A61M 39/14 604/905 |
| 9,851,037 B2 | * | 12/2017 | Whitaker | F16K 3/00 |
| 10,195,416 B2 | * | 2/2019 | Gebauer | A61M 39/18 |
| 10,267,443 B2 | * | 4/2019 | Blake | A61M 39/18 |
| 10,584,818 B2 | * | 3/2020 | Blake | A61M 39/1011 |
| 10,966,404 B2 | * | 4/2021 | Balkenhol | F16L 55/105 |
| 11,965,613 B2 | * | 4/2024 | Trummer | F16L 23/10 |
| 12,000,515 B2 | * | 6/2024 | Benson | F16L 37/26 |

(Continued)

FOREIGN PATENT DOCUMENTS

WO WO-2024118617 A1 * 6/2024 .............. F16L 23/04

*Primary Examiner* — Jacob J Cigna
(74) *Attorney, Agent, or Firm* — Fenwick & West LLP

(57) ABSTRACT

A genderless interface connector pull tool is used for removing a membrane from a genderless interface connector. The tool may include a clamp and a hand grip. The clamp is configured to clamp a genderless interface connector and may include a top clamp coupled with a bottom clamp, and a pair of rails located on a top surface of the top clamp. The hand grip may include a grip head which is formed with a hook and one or more openings. The hook is configured to engage with a tab of the genderless interface connector that is connected to a membrane. The one or more openings are dimensioned to fit with the pair of rails so that the hand grip can slide on the rails to pull the tab. Thus, the membrane connected to the tab can be removed from the genderless interface connector along the rails' direction.

20 Claims, 7 Drawing Sheets

(56) References Cited

U.S. PATENT DOCUMENTS

| | | | |
|---|---|---|---|
| 12,123,526 B2* | 10/2024 | Yuen | F16L 29/002 |
| 12,171,972 B2* | 12/2024 | Kim | B25B 27/14 |
| 2016/0186906 A1* | 6/2016 | Blake | A61M 39/1011 |
| | | | 285/319 |
| 2024/0399131 A1* | 12/2024 | Wise | A61M 39/14 |

* cited by examiner

GENDERLESS INTERFACE CONNECTOR PULL TOOL

TECHNICAL FIELD

The disclosure generally relates to a pull tool and in particular, to a pull tool for removing a membrane from a genderless interface connector.

BACKGROUND

To prevent the content within tubes from escaping while connecting two or more tubes, sterile genderless interface connectors are used to connect the tubes at the point of connection. A genderless interface connector includes a membrane at the interface inside the connector and a tab outside the connector that is attached to the membrane. The membrane prevents fluid connection between the connected tubes at the interface. After the genderless interface is securely engaged with the tubes on each side, the tab can be pulled away from the connector to remove the membrane from the interface so that the tubes are connected. In this way, sterility is maintained in the tubes and the connection does not contaminate the environment. However, pulling the tab by hand has ergonomic implications because of the force and impact stress induced throughout the process. Depending on the direction of the pulling force, the membrane may be partially removed or torn, causing damages to the sterile condition. Furthermore, if significant force is applied to pull the tab, this can lead to dislocation of the genderless interface connector, further compromising the sterility of the environment. Therefore, a method and apparatus for securely removing the membrane from the genderless interface connector without damaging the sterile condition is needed.

SUMMARY

A genderless interface connector pull tool can be used to remove a membrane from a genderless interface connector. The tool includes a clamp to securely hold the genderless interface connector. The tool also includes a pair of guided rails and a hand grip. The hand grip may slide on the guided rails. A user can engage a hook of the hand grip with a tab of the genderless interface connector to pull the membrane from the genderless interface connector. In this way, the membrane is removed from the genderless interface connector along the guided rails. The guided rails control the direction of movement of the membrane during removal, thus reducing the potential damage to the membrane and maintaining the sterile condition of the interface.

In one embodiment, the genderless interface connector pull tool may include a clamp and a hand grip. The clamp is configured to clamp a genderless interface connector and may include a top clamp coupled with a bottom clamp, and a pair of rails located on a top surface of the top clamp. The hand grip may include a grip head which is formed with a hook and a pair of side walls. The hook is configured to engage with a tab of the genderless interface connector. The side walls may be separated with an opening, and the opening may be sized to fit the rails. When the grip head slides on the rails, the movement of the grip head is guided by the rails and is limited along the direction of the rails. In another embodiment, the side walls may each include a groove. The grooves are dimensioned to fit with the pair of rails so that the hand grip can slide on the rails to pull the tab. In this way, the membrane which is connected to the tab can be removed from the genderless interface connector along the rails' direction.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a perspective view of a genderless interface connector pull tool, according to one embodiment.

DETAILED DESCRIPTION

Figure 1:
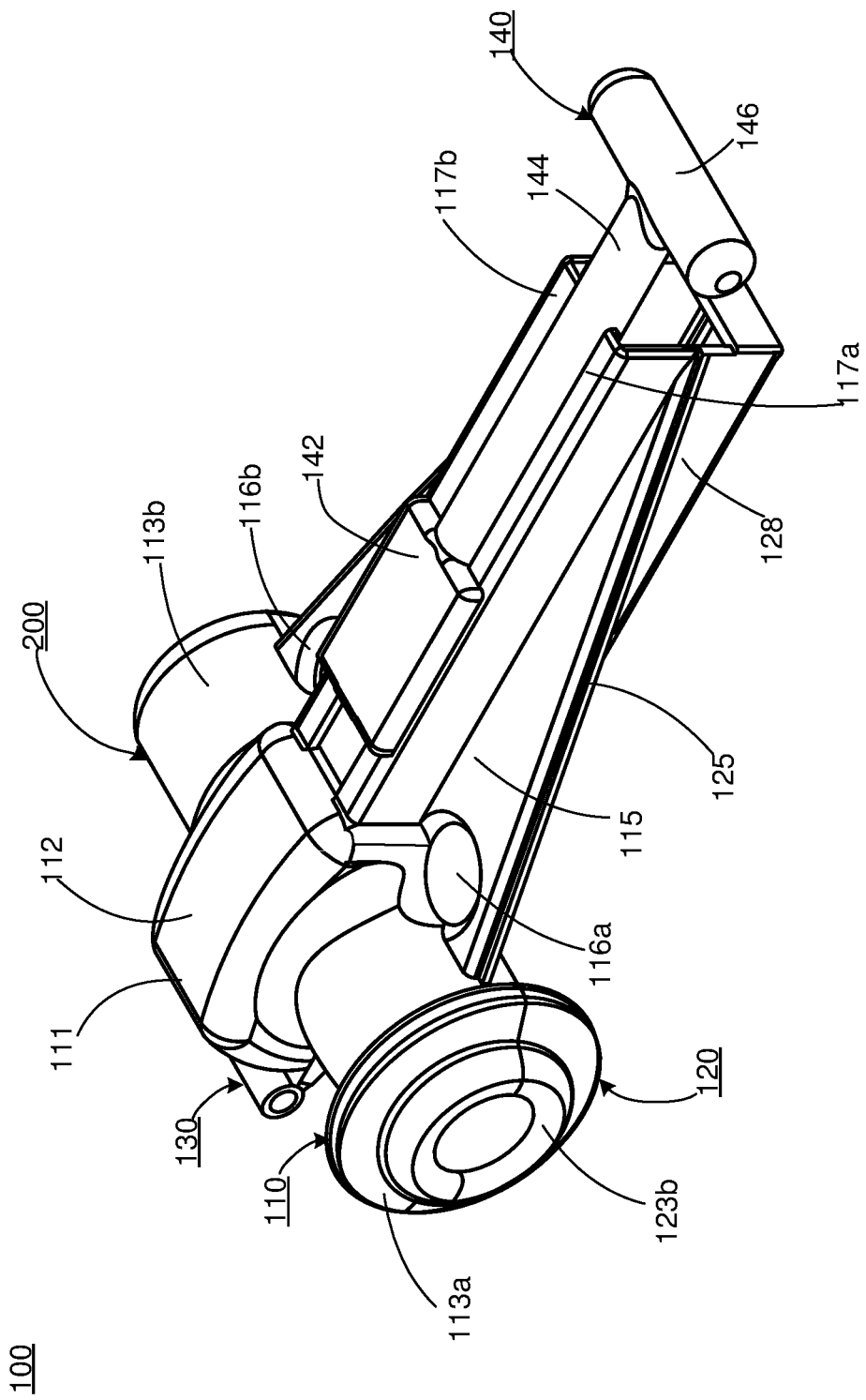

The Figures (FIGS.) and the following description describe certain embodiments by way of illustration only. One skilled in the art will readily recognize from the following description that alternative embodiments of the structures and methods may be employed without departing from the principles described. Wherever practicable, similar or like reference numerals identify similar or identical structural elements or identify similar or like functionality. Where elements share a common numeral followed by a different letter, the elements are similar or identical. The numeral alone refers to any one or any combination of such elements.

Throughout the following description, the term "proximal" refers to the end of the apparatus which is closer to the user when being used as intended and described, and the term "distal" refers to the end of the apparatus which is further away from the user when being used as intended and described. The following description relates to embodiments of the apparatus for use with a "genderless interface connector." In other embodiments, the apparatus may be used with other types of genderless interface connectors.

Genderless Interface Connector Pull Tool Structure

FIGS. 1-5 show the structure of an embodiment of a genderless interface connector pull tool 100 through various views. In the embodiment shown, the tool 100 includes a clamp 200 and a hand grip 140. The clamp 200 is used to hold a genderless interface connector 150 and the hand grip 140 is used to pull a tab 154 of the genderless interface connector 150 to remove a membrane from the genderless interface connector 150. The clamp may include a top clamp 110, a bottom clamp 120, and a pivot mechanism 130. The top clamp 110 includes a distal end 111 and a proximal end 115 opposite from one another. Similarly, the bottom clamp 120 includes a distal end 121 and a proximal end 125. The top clamp 110 has a top surface and a bottom surface, and the bottom surface is couple with the bottom clamp 120. When the bottom clamp 120 is coupled with the bottom surface of the top clamp 110, the top clamp 110 and bottom clamp 120 clamp the genderless interface connector 150.

The distal end 111 of the top clamp 110 includes a top connector holder 112 and a pair of top tube holders 113a and 113b (collectively referred to as "top tube holders 113" hereinafter) located on each side of the top connecter holder 112. Similarly, the distal end 121 of bottom clamp 120 includes a bottom connector holder 122 and a pair of bottom tube holders 123a and 123b (collectively referred to as "bottom tube holders 123") located on each side of the bottom connector holder 122. The top connector holder 112 and the bottom connector holder 122 are configured to be aligned with each other to create a connector space when the clamp 200 is closed. The created space is used to hold and secure a connector part 153 of the genderless interface connector 150 while closing the tab 154 of the genderless interface connector 150 outside. The top tube holders 113 and the bottom tube holders 123 are also configured to be aligned respectively to create tube spaces for holding tubes 151a and 151b. The created tube spaces have an open end on each side so that the tubes 151a and 151b can fit through the created tube spaces.

The dimensions of the distal ends 111 and 121 are sized to account for the dimensions of the genderless interface connector 150 and the tubes 151a and 151b. The connector space created by the connector holders 112 and 122 is large enough to hold the connector part 153 without applying pressure but small enough so that the connector part 153 is not dislocated when removing the membrane from the genderless interface connector 150. For example, the connector part 153 has a round shape, and the intersection area of the connector space may have a circular shape. In some embodiments, the width (d1) of the intersection area may be between 20-60 mm (e.g., 40 mm). The tube spaces created by the top tube holders 113 and the bottom tube holders 123 are also sized to accommodate the respective tubes 151a and 151b so that the tubes 151a and 151b can sit freely within the tube spaces. In some embodiments, the length (d2) of the tube space on each side may be between 45-60 mm long. The inner diameter (d3) and the outer diameter (d4) of the tube space may range from 25 mm to 64 mm.

In some embodiments, the distal ends 111 and 121 are identical to each other. Similarly, the top tube holders 113a and 113b may be identical with each other and the bottom tube holders 123a and 123b may be identical with each other. Alternatively, the top tube holder 113a and the bottom tube holder 123a may be different from the top tube holder 113b and the bottom tube holder 123b, respectively, creating different tube spaces on each side. One side of the tube holders, e.g., 113a and 123a, may include clip features that secure the closure of the clamp 200.

The proximal ends 115 and 125 are configured to be held in the hand of a user. In the embodiment shown, the proximal end 115 of the top clamp 110 includes a pair of top finger holes 116a and 116b (collectively referred to as "top finger holes 116") and a pair of guide rails 117a and 117b (collectively referred to as "rails 117") located on the top surface of the top clamp 110. The top finger holes 116 are located on each side of the rails 117. The proximal end 125 of the bottom clamp 120 includes a pair of bottom finger holes 126a and 126b (collectively referred to as "bottom finger holes 126"), which are aligned with the top finger holes 116 when the clamp 200 is closed so that a user can hold the clamp 200 with fingers passing through the finger holes 116 and 126. The distance between the centers of the top finger holes 116 may be selected based on the average hand size of humans (e.g., the finger holes may be separated by 59 mm). The rails 117 are connected to the connector holders 112 and 122 and provide a guide for the movement of the hand grip 140. In this way, when using the hand grip 140 to pull the tab 154, the tab 154 will travel along the hand grip 140 without moving in other directions, thereby reducing the possibility of membrane tearing or dislocation. The length of the rails 117 may be longer than the pulling distance of the tab 154 so that the tab 154, moved along the rails 117, can pull the membrane completely. The length of the rails 117 may also be coordinated with the length of the hand grip 140. In one example, the length of the rails 117 is approximately 140 mm. In some embodiments, the proximal ends 115 and 125 have a trapezoid shape, with the side that connect to the connector holders 112 and 122 longer than the opposite side.

Figure 3:
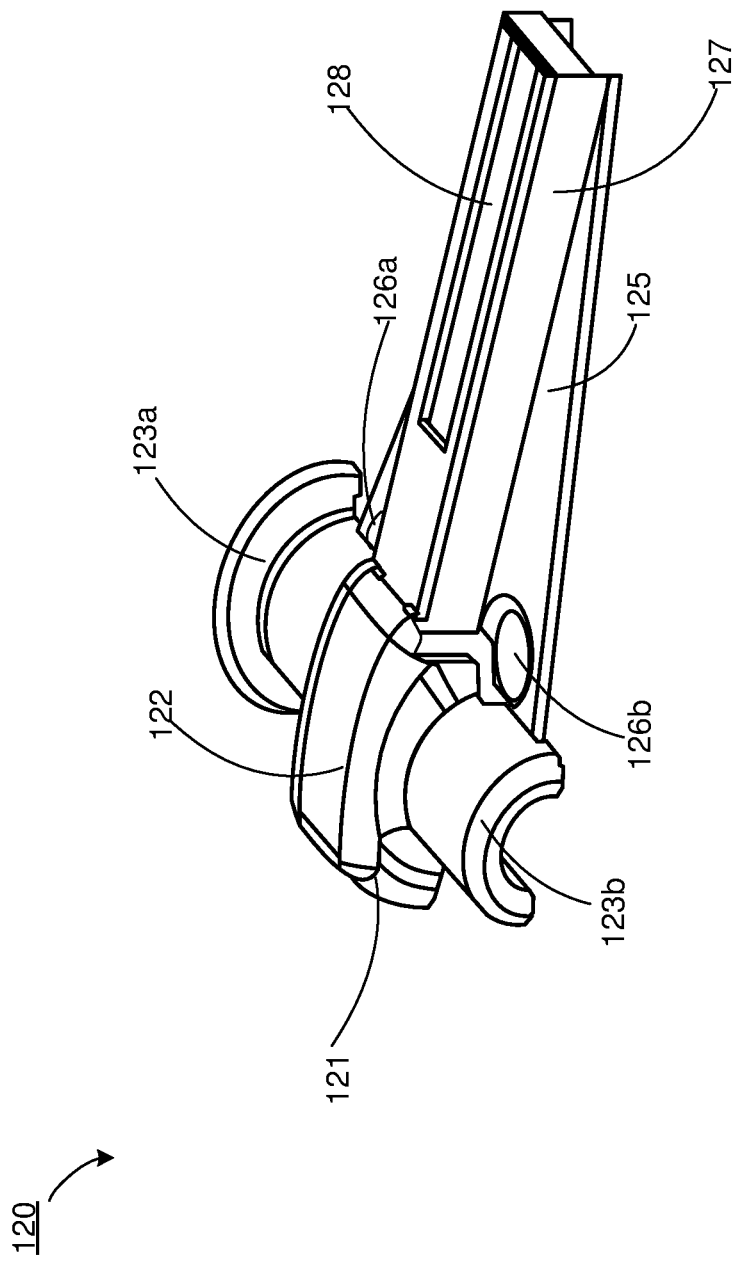
FIG. 3 is a perspective view of a bottom clamp of the genderless interface connector pull tool of FIG. 1, according to one embodiment.

In some embodiments, the proximal ends 115 and 125 may be identical with each other. The proximal end 125 of the bottom clamp 120 may also include the same rails so that the hand grip 140 can slide on both the top clamp 110 and bottom clamp 120. Alternatively, the proximal end 125 of the bottom clamp 120 may not include the rails as the top clamp 110. For example, as shown in FIG. 3, the proximal end 125 of the bottom clamp 120 may include a supporting structure 127 and the supporting structure 127 include an opening 128 which is aligned with an opening 118 between the rails 117. The openings 118 and 128 create a space for the hand grip 140 and the tab 154 to travel through.

Figure 2A:
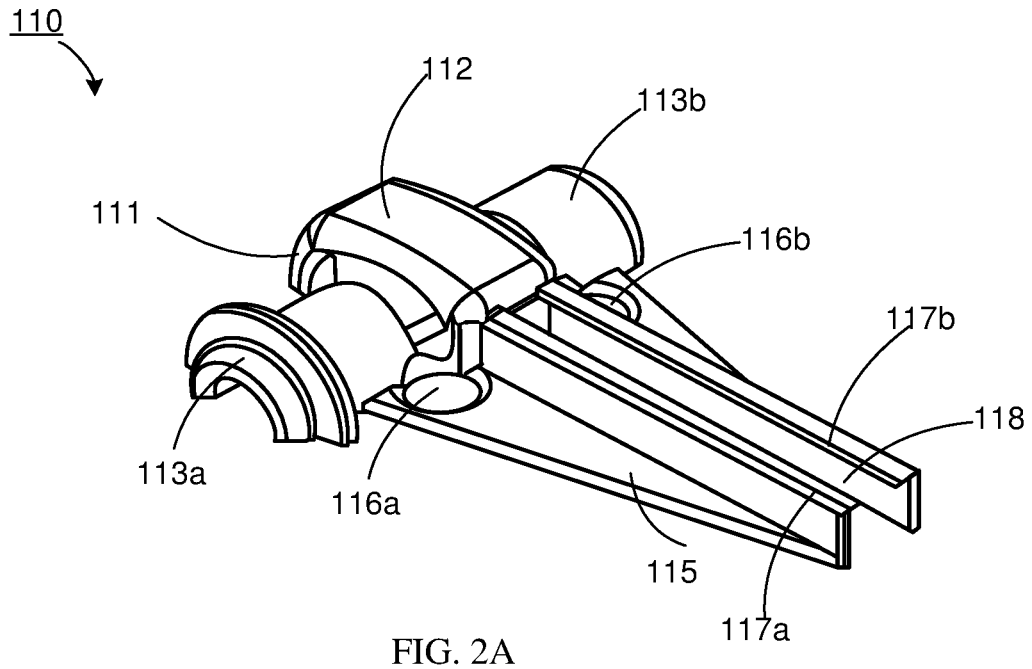
FIG. 2A is a perspective view of a top clamp of the genderless interface connector pull tool of FIG. 1, according to one embodiment.
Figure 2B:
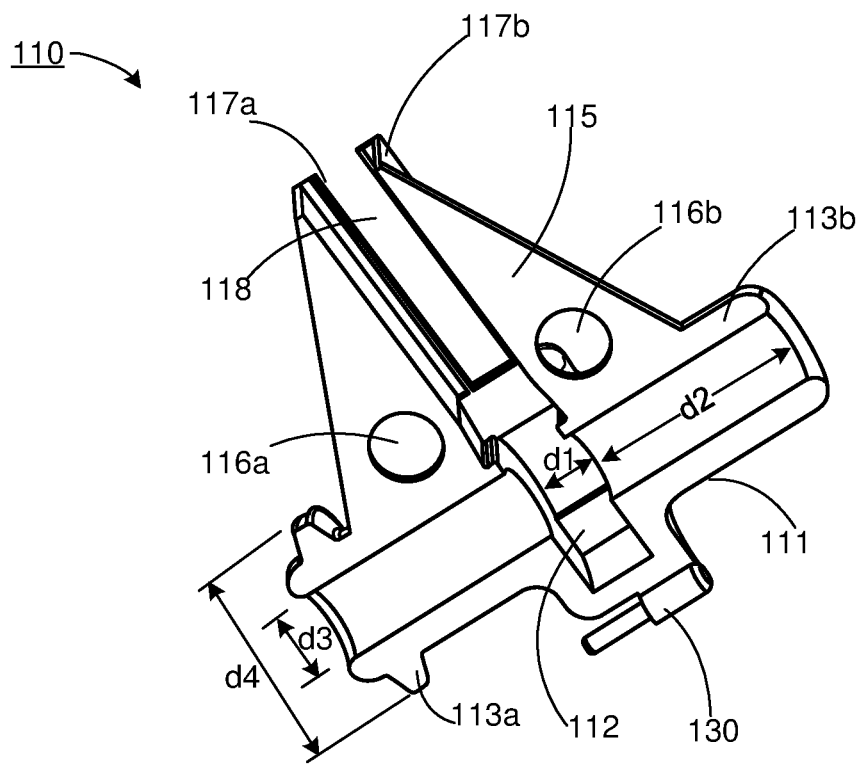
FIG. 2B is a bottom view of the top clamp of the genderless interface connector pull tool of FIG. 1, according to one embodiment.
Figure 4:
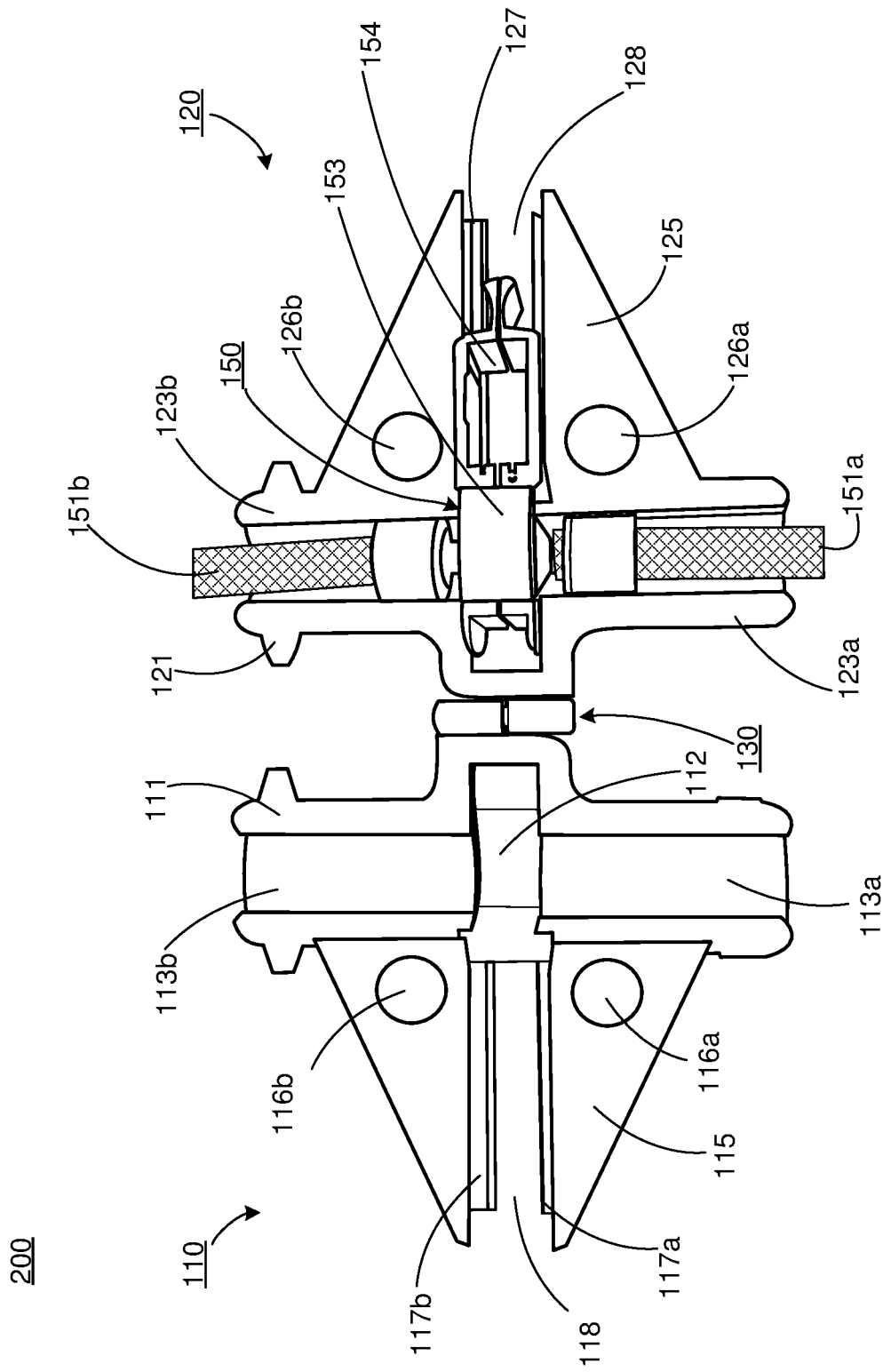
FIG. 4 is a view of the genderless interface connector pull tool of FIG. 1 in an unfold position, according to one embodiment.

The pivot mechanism 130 couples the top clamp 110 to the bottom clamp 120. In some embodiments, the pivot mechanism 130 limits the position of top clamp 110 to the bottom clamp 120 such that they may rotate relative to each other around the pivot mechanism 130. For example, the pivot mechanism 130 may include a hinge. As shown in FIG. 2B and FIG. 4, the hinge 130 includes two parts coupled to the top clamp 110 and the bottom clamp 120, respectively. The two parts of the hinge 130 may be located at the center of the connector holders 112 and 122 and connected to form the hinge 130.

Figure 5:
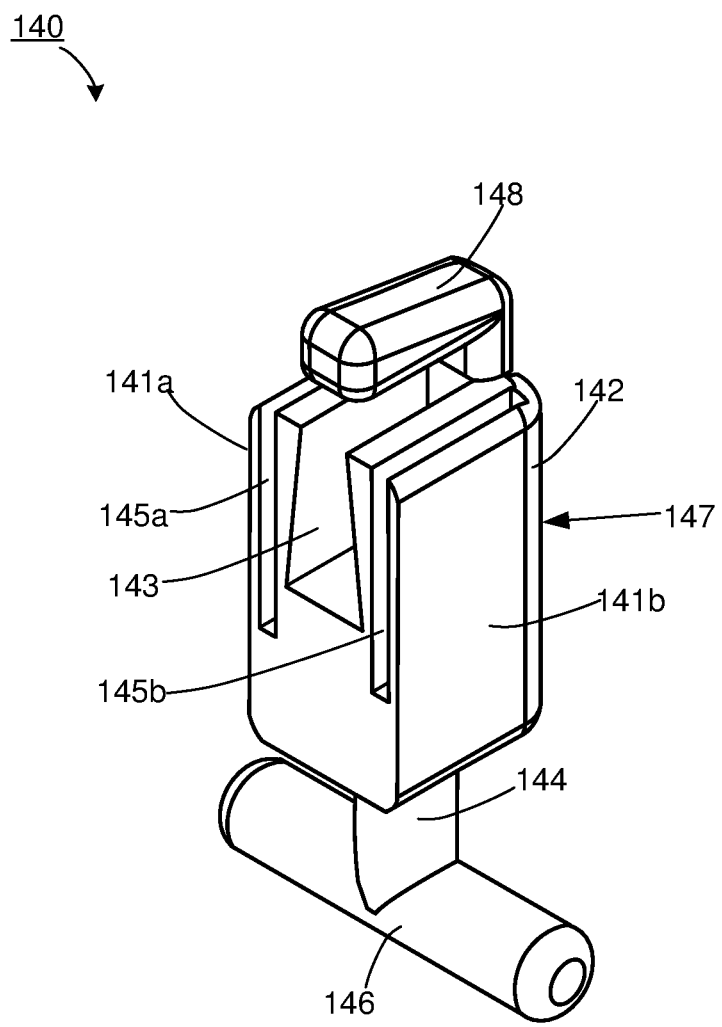
FIG. 5 is a perspective view of a hand grip of the genderless interface connector pull tool of FIG. 1, according to one embodiment.

The hand grip 140 slides on the rails 117 to pull the tab 154 such that a membrane can be securely removed from the genderless interface connector 150 without damaging the sterile condition of the genderless interface connector 150, as shown in FIGS. 1 and 5. The hand grip 140 may include a grip head 142, a handle 144, and a knob 146. The grip head 142 include a pair of side walls 141a and 141b, an opening 143 and a hook 148. The hook 148 is used to engage the tab 154 of the genderless interface connector 150 and apply a force to pull the tab 154 away from the connector part 153 of the genderless interface connector 150. The tab 154 may fit into the opening 143. The opening 143 may be sized to accommodate the rails 117. The rails 117 fit inside the opening 143 and closely contact with the inner surfaces of the side walls 141a, 141b so that when the grip head 142 slide on the rail 117, the movement of the grip head 142 is guided by the rails 117 and is limited along the direction of the rails 117. Alternatively, the side walls 141a, 141b may each include a groove 145a and 145b, as shown in FIG. 5. The grooves 145a, 145b may be sized to tightly fit the rails 117 on the top clamp 110. In this way, when the grip head 142 sits on the rails 117 by fitting the grooves 145a, 145b on the rails 117, the movement of the grip head 142 is guided by the rails 117 and is limited along the direction of the rails 117.

In some embodiments, the grip head 142 may further include a ramp on the top surface of the grip head 142, providing a structural support for the grip head 142. In one example, the ramp may be formed in an arch shape. The grip head 142 is connected to the knob 146 by the handle 144. A user may hold the knob 146 and pull the tab 154 to remove the membrane. Pulled by the hook 148, the movement of the tab 154 is also guided by the rails 117 and movements in other directions are prevented. As a result, the membrane can be removed from the genderless interface connector 150 without damage or dislocation. In one example, the length of the handle 144 may be longer than the length of the rails 117. In another example, the length of the handle 144 may be adjustable. The grip head 142, the tab 154, and the handle 144 may be confined inside the opening 118 between the rails 117, which further limits the movement direction to the rails' direction.

Material from which the tool 100 may be manufactured includes OnyX, nylon, reinforced nylon (e.g., a carbon fiber and nylon blend), carbon fiber, metal, glass fiber, any comparable material with a flexural modulus between 1.5-450 gigapascals (GPa) and notched Izod impact strength of at least 20 joules per meter (Jim), or a suitable combination thereof. Additionally, the tool may be fabricated using a non-additive manufacturing technique such as injection molding or machining. The material or materials used may be selected based on the requirements of a classified environment in which it may be used. A method of manufacturing the tool 100 is described in the description of FIG. 7.

Genderless Interface Connector Pull Tool Operation

Figure 6:
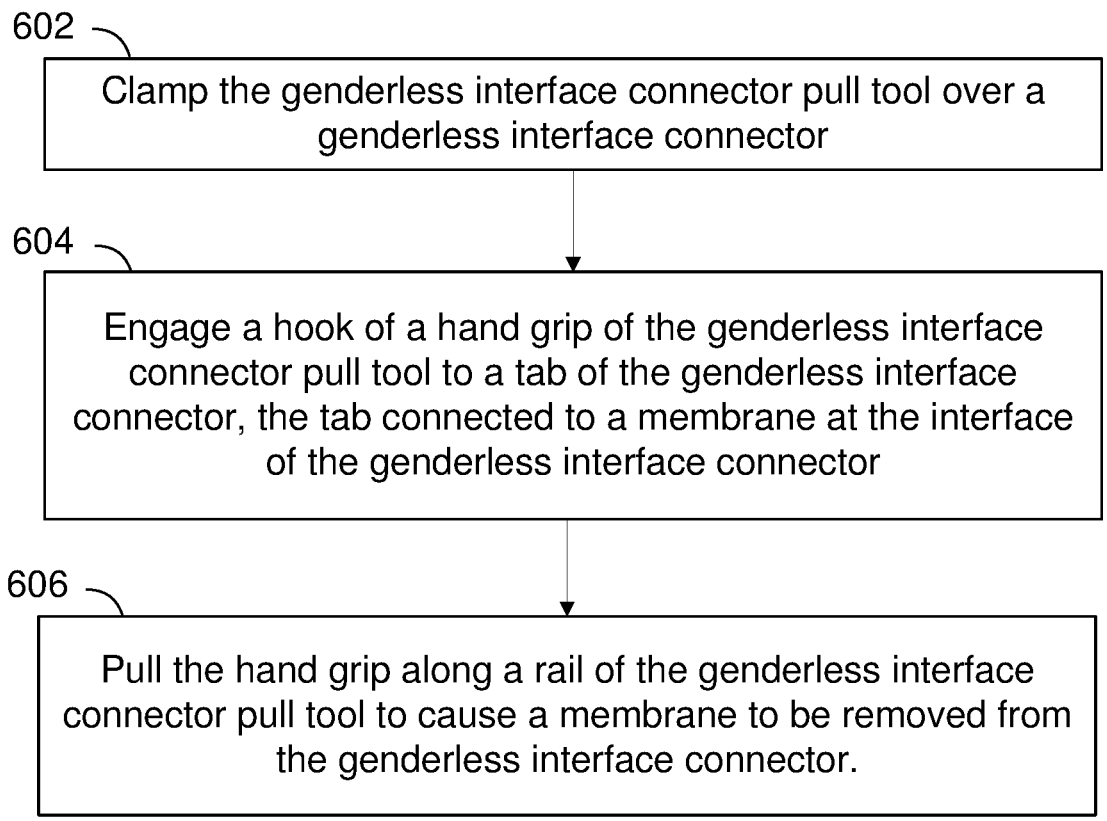
FIG. 6 is a flowchart illustrating a process for using a genderless interface connector pull tool, according to one embodiment.

The genderless interface connector pull tool described herein can be used to remove a membrane from a genderless interface connector. FIG. 6 is a flowchart illustrating a process 600 for using a genderless interface connector pull tool 100, according to one embodiment. In the embodiment shown, the process 600 begins with clamping 602 the pull tool 100 to the genderless interface connector 150 with the clamp 200. For example, the connector part 153 of the genderless connector 150 is placed into the space created by the connector holders 112 and 122. The genderless connector 150 connects to the tubes 151 on each side, and the tubes 151 are placed into the spaces created by the top tube holders 113 and the bottom tube holders 123 respectively. The top clamp 110 and bottom clamp 120 are then closed to secure the genderless interface connector 150. The hook 148 of the hand grip 140 may engage 604 with the tab 154 of the genderless interface connector 150. The tab 154 is connected to the membrane at the interface of the genderless interface connector 150. To remove the membrane from the genderless interface connector 150, a force is applied to the knob 146 of the hand grip 140 to pull 606 the hand grip 140 along the rails 117, the force causing the tab 154 to move along the rails 117 and the membrane is removed from the genderless interface connector 150. In this way, the membrane is removed from the genderless interface connector 150 in a guided direction without movement in other directions, thus reducing the potential damage to the membrane and maintaining the sterile condition of the interface.

Genderless Interface Connector Pull Tool Manufacture

Figure 7:
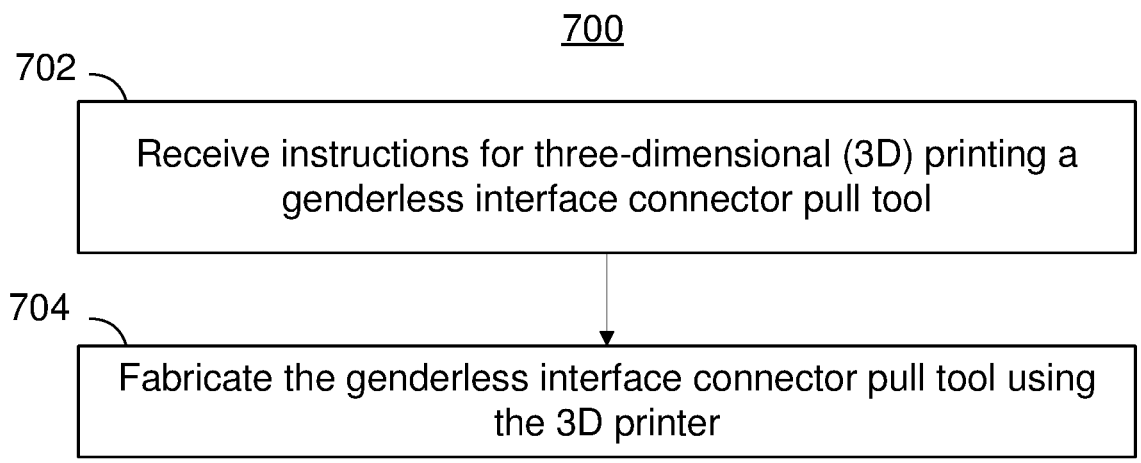
FIG. 7 is a flowchart illustrating a process for manufacturing a genderless interface connector pull tool, according to one embodiment.

FIG. 7 is a flowchart illustrating a process 700 for manufacturing a genderless interface connector pull tool, according to one embodiment. In some embodiments, a non-transitory computer readable medium stores instructions that, when executed by one or more processors of a system, cause the system to perform the method 700. Thus, the system is enabled to receive 702 instructions for three-dimensional (3D) printing a genderless interface connector pull tool and fabricate 704 the genderless interface connector pull tool using a 3D printer or any other suitable manufacturing process. The tool may be fabricated using any suitable additive manufacturing technique. For example, an additive manufacturing system having one or more processors may receive instructions from a non-transitory computer readable medium for manufacturing the tool using one or more additive manufacturing techniques and execute those instructions to manufacture the tool. Additionally, the tool may be fabricated using a non-additive manufacturing technique such as injection molding or machining that involves a machine whose operations may be realized upon the execution of instructions stored on non-transitory computer readable medium.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where values are described as "approximate" or "substantially" (or their derivatives), such values should be construed as accurate +/−10% unless another meaning is apparent from the context. From example, "approximately ten" should be understood to mean "in a range from nine to eleven."

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

What is claimed is:

1. A tool comprising:
    a clamp including:
        a top clamp having a top surface and a bottom surface;
        a bottom clamp configured to couple with the bottom surface of the top clamp, wherein, when the bottom clamp is coupled with the bottom surface of the top clamp, the top clamp and bottom clamp clamp a genderless interface connector; and
        a pair of rails located on the top surface of the top clamp; and
    a hand grip including a grip head having:
        a hook configured to engage with a tab of the genderless interface connector; and
        one or more openings dimensioned to fit with the pair of rails such that the hand grip slides on the pair of rails to pull the tab, causing a membrane inside the genderless interface connector to be removed along the rails' direction.

2. The tool of claim 1, wherein the top clamp and the bottom clamp each comprise a connector holder, and the connector holders are coupled to create a space for accommodating a connector part of the genderless interface connector.

3. The tool of claim 1, wherein the top clamp comprises a pair of top tube holders and the bottom clamp comprises a pair of bottom tube holders, and the top tube holders and bottom tube holders are coupled to create spaces for accommodating tubes that are connected by the genderless interface connector.

4. The tool of claim 1, wherein the top clamp comprises a pair of top finger holes and the bottom clamp comprises a pair of bottom finger holes, and the top finger holes and bottom finger holes are aligned such that a user can hold the tool with fingers passing through the top finger holes and the bottom finger holes.

5. The tool of claim 1, wherein the hand grip further comprises a pair of side walls, the one or more openings include an opening located between the side walls, and the pair of rails fit inside the opening to guide the hand grip to slide on the rails.

6. The tool of claim 1, wherein the one or more openings include a pair of grooves fitting with the pair of rails to guide the hand grip to slide on the rails.

7. The tool of claim 1, wherein the tool is composed of a material comprising at least one of nylon, reinforced nylon, carbon fiber, metal, or glass fiber.

8. The tool of claim 1, wherein the hand grip further comprises:
    a knob configured to be pulled by a user; and
    a handle connecting the knob with the grip head.

9. The tool of claim 1, further comprising a pivot mechanism configured to couple the bottom surface of the top clamp and the bottom clamp.

10. The tool of claim 9, wherein the pivot mechanism includes a hinge.

11. A non-transitory computer readable medium comprising stored instructions for fabricating a tool, the instructions when executed by at least one processor cause the at least one processor to:
    transmit instructions for the tool to be printed on a three-dimensional (3D) printer, the tool comprising:
        a clamp including:
            a top clamp having a top surface and a bottom surface;
            a bottom clamp configured to couple with the bottom surface of the top clamp, wherein, when the bottom clamp is coupled with the bottom surface of the top clamp, the top clamp and bottom clamp clamp a genderless interface connector; and
            a pair of rails located on the top surface of the top clamp; and
        a hand grip including a grip head having:
            a hook configured to engage with a tab of the genderless interface connector; and
            one or more openings dimensioned to fit with the pair of rails such that the hand grip slides on the pair of rails to pull the tab, causing a membrane inside the genderless interface connector to be removed along the rails' direction; and
    fabricate the tool using the 3D printer.

12. The non-transitory computer readable medium of claim 11, wherein the top clamp and the bottom clamp each comprise a connector holder, and the connector holders are coupled to create a space for accommodating a connector part of the genderless interface connector.

13. The non-transitory computer readable medium of claim 11, wherein the top clamp comprises a pair of top tube holders and the bottom clamp comprises a pair of bottom tube holders, and the top tube holders and bottom tube holders are coupled to create spaces for accommodating tubes that are connected by the genderless interface connector.

14. The non-transitory computer readable medium of claim 11, wherein the top clamp comprises a pair of top finger holes and the bottom clamp comprises a pair of bottom finger holes, and the top finger holes and bottom finger holes are aligned such that a user can hold the tool with fingers passing through the top finger holes and the bottom finger holes.

15. The non-transitory computer readable medium of claim 11, wherein the hand grip further comprises a pair of side walls, the one or more openings include an opening located between the side walls, and the pair of rails fit inside the opening to guide the hand grip to slide on the rails.

16. The non-transitory computer readable medium of claim 11, wherein the tool is composed of a material comprising at least one of nylon, reinforced nylon, carbon fiber, metal, or glass fiber.

17. The non-transitory computer readable medium of claim 11, wherein the one or more openings include a pair of grooves fitting with the pair of rails to guide the hand grip to slide on the rails.

18. The non-transitory computer readable medium of claim 11, wherein the tool further comprises a pivot mechanism configured to couple the bottom surface of the top clamp and the bottom clamp.

19. The non-transitory computer readable medium of claim 18, wherein the pivot mechanism includes a hinge.

20. A method for using a tool having a clamp and a hand grip, the method comprising:
   clamping a genderless interface connector pull tool over the genderless interface connector, wherein the clamp includes:
      a top clamp having a top surface and a bottom surface;
      a bottom clamp configured to couple with the bottom surface of the top clamp, wherein, when the bottom clamp is coupled with the bottom surface of the top clamp, the top clamp and bottom clamp clamp the genderless interface connector; and
      a pair of rails located on the top surface of the top clamp;
   engaging a hook of the hand grip to a tab that is connected to a membrane inside the genderless interface connector; and
   pulling the hand grip to slide along the pair of rails to cause the membrane to be removed from the genderless interface connector along the rails' direction, wherein the hand grip includes one or more openings dimensioned to fit with the pair of rails such that the hand grip slides on the pair of rails to pull the tab.

* * * * *